United States Patent [19]

Schoen

[11] Patent Number: 4,585,302
[45] Date of Patent: Apr. 29, 1986

[54] GUIDE SLEEVE FOR LIGHT WAVEGUIDE PLUG DEVICES UTILIZING A SLIDING SLEEVE FOR WIPING PIN SHAPED BODIES

[75] Inventor: Josef Schoen, Geretsried, Fed. Rep. of Germany

[73] Assignee: Siemens Aktiengesellschaft, Berlin & Munich, Fed. Rep. of Germany

[21] Appl. No.: 526,373

[22] Filed: Aug. 25, 1983

[30] Foreign Application Priority Data

Sep. 13, 1982 [DE] Fed. Rep. of Germany ....... 8225781

[51] Int. Cl.$^4$ ................................................. G02B 6/36
[52] U.S. Cl. ................................................. 350/96.20
[58] Field of Search ................. 350/96.20, 96.21, 96.22

[56] References Cited

U.S. PATENT DOCUMENTS 4,184,741 1/1980 Hawk et al. ...................... 350/96.20
4,198,119 4/1980 Uberbacher ...................... 350/96.20
4,411,491 10/1983 Larkin et al. ..................... 350/96.21

FOREIGN PATENT DOCUMENTS 2516858 10/1976 Fed. Rep. of Germany .
0009450 1/1977 Japan .............................. 350/96.21

Primary Examiner—John Lee
Assistant Examiner—Lester Rushin, III
Attorney, Agent, or Firm—Hill, Van Santen, Steadman & Simpson

[57] ABSTRACT

An improved guide sleeve for receiving a pin shaped body or plug pin containing a lightwave guide to form a lightwave guide plug connection characterized by the guide sleeve having a cylindrical acceptance opening extending to at least one end for receiving the pin and terminating in an enlarged diameter cylindrical portion coaxial with the acceptance opening, and a sliding sleeve of a synthetic plastic material such as polytetrafluoroethylene being disposed in the enlarged diameter portion and having a decreasing inner diameter forming a lip adjacent one end of the sliding sleeve which one end is adjacent the acceptance opening. Thus when a pin-shaped body is inserted into the guide sleeve, the outer surface of the body will be wiped by the lip to limit or prevent the introduction of dirt or other substances into the interior of the guide sleeve.

4 Claims, 1 Drawing Figure

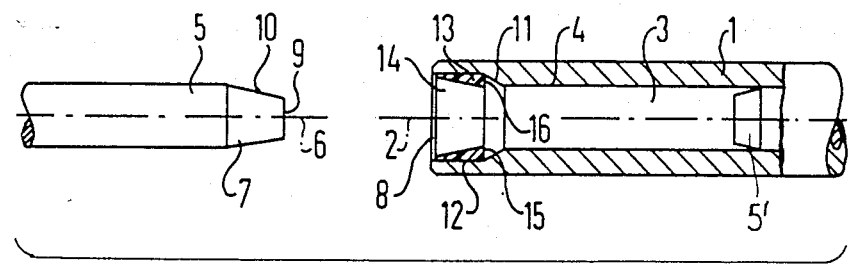

GUIDE SLEEVE FOR LIGHT WAVEGUIDE PLUG DEVICES UTILIZING A SLIDING SLEEVE FOR WIPING PIN SHAPED BODIES

BACKGROUND OF THE INVENTION

The present invention is directed to a guide sleeve for a light waveguide plug device. The guide sleeve has a cylindrical bore or opening extending coaxially with an axis of the sleeve to at least one end of the sleeve to form an acceptance opening for receiving a pin-shaped body or plug. The cylindrical bore or acceptance opening is matched to the cylindrical surface of the pin shaped body to enable forming a play-free fit therewith.

Guide sleeves having an acceptance opening for receiving a pin-shaped body are disclosed for example in German OS No. 25 16 858. As illustrated in this reference, the guide sleeve has a hollow-cylindrical bore extending through to both ends which receive pin-shaped bodies or plugs. Each of the pin-shaped bodies or plugs has a waveguide which is precisely centered relative to the outside surface of the plug. The hollow cylindrical surface of the bore of the guide sleeve is matched as precisely as possible to the outside diameter of each of the bodies and the end faces of the light waveguide in the bodies are precisely engaged with one another when the bodies are inserted into the guide sleeve from opposite ends. Thus, the axis of the two light waveguides are brought to coincide with one another and a low loss connection between the two light waveguides can be formed.

It is clear that such a light waveguide plug device exhibits lower and lower losses when the difference between the inside diameter of the guide sleeve and the outside diameters of each of the bodies is reduced. Thus, the plug connection requires a nearly play-free design for the fit between the sleeve and the pin-shaped body or plug pin.

When introducing each of the plug pins into the sleeve however dust, which has settled on outer surface of the plug pin, is frequently transported into the inside of the sleeve. This dust can pinch a pin in the sleeve and can damage the precise surfaces of the pin and sleeve especially during exertion of greater force which is required for separating the pins from the sleeve.

SUMMARY OF THE INVENTION

The present invention is directed to providing an improvement in the structure of a guide sleeve which has an acceptance opening for receiving pin-shaped bodies to form a plug connection so that the operability and reliability of the light waveguide plug device can be maintained as long as possible even when a relative large number of plug-in events have occurred from connecting and disconnecting the connection.

To achieve these objects, the present invention is directed to an improvement in a guide sleeve for receiving the pin-shaped body having a light waveguide to form a light waveguide plug connection, said guide sleeve having a cylindrical bore extending coaxially on an axis of the sleeve to at least one end of the sleeve to form an acceptance opening for receiving the pin-shaped body, said cylindrical bore being matched to the cylindrical surface of the pin-shaped body to enable forming a play-free fit therebetween. The improvement comprises said sleeve at the free end of the cylindrical bore having a second hollow cylindrical bore coaxial to the first mentioned cylindrical bore and of a larger diameter, and a sliding sleeve of a synthetic plastic material being disposed in said bore with the first end of the sliding sleeve being adjacent to the first bore, said sliding sleeve having a tapering inside diameter decreasing toward said first end so that during insertion of the pin-shaped body into the acceptance opening said sliding sleeve wipes the outer surface of the pin shaped body.

Light waveguide plug devices, which are more frequently actuated, are predominantly employed in plug-in technology. When pulling racks for the purpose of maintenance or repair of circuit parts which are connected by a plug-in connections, a separation or disconnection of the plug device which is subsequently reconnected will occur each time. The highly precise surfaces of the parts of the plug device must thereby cooperate by sliding on one another. Particularly given an introduction of the plug pin into the guide sleeve, the subject of the present invention advantageously prevents grains of dust which if settled on the surface of pin-shaped body or plug from having an abrasive effect on these surfaces or even pinching the pin in the sleeve. These dust particles namely are prevented from being transported into the inside of the guide sleeve by means of the annular and elastic stripping lip which is formed by the narrowest or smallest inside diameter of the sliding sleeve.

It can be provided in a further development of the invention that a transition section extends between the first and second bore and has a conical or tapering shape expanding from the first bore towards the second bore. In addition, the sliding sleeve is preferably provided with a limiting or end wall adjacent the first end which extends at right angles relative to the axis of the sleeve and this wall coacts with the inner surface of the sliding sleeve to form a stripping lip which will be adjacent the transition section. By so doing, the transition section advantageously creates a space adjacent to the one end of the sliding sleeve and adjacent the first bore of the guide sleeve so that the stripping lip or the inner edge of the sliding sleeve adjacent the first end can elastically escape into the space when the plug pin has been introduced into the guide sleeve somewhat eccentrically.

BRIEF DESCRIPTION OF THE DRAWING

The FIGURE is a side view of one end of a guide sleeve and a guide pin in accordance of present invention with portions broken away.

DESCRIPTION OF THE PREFERRED EMBODIMENT

The principal present invention are particularly useful when incorporating a guide sleeve 1. The sleeve 1 consists of metal and has a hollow cylindrical bore forming an acceptance opening 3 which is disposed coaxially and concentrically relative to an axis 2 of the sleeve 1 and opens at an end 8 of the sleeve 1. The acceptance opening 3 has an inner surface 4 which is produced with a high precision so that an outer surface 5 of a plug pin or pin shaped body 7 can be received with very little tolerance and form a play-free fit. The outer surface 5 of the pin 7 is concentric and coaxially aligned with an axis 6 of the pin.

A light waveguide end section is secured in the plug pin 7 to be concentric with the axis 6 of the pin. The axis of the light waveguide end section which is mounted in the plug pin 7 is aligned precisely to a continuing light waveguide end section when the plug pin 7 is inserted into the end 8 of the guide sleeve 1 to form a plug connection. The continuing light waveguide end section can be secured in the guide sleeve at an end opposite to the end 8 which receives the pin 5 and is concentric to the axis 2 of the sleeve. In most designs, the sleeve 1 has the acceptance opening 3 which extends through the sleeve so that the continuing light waveguide end section is mounted in a second or additional plug body 5' which is inserted from the other end of the guide sleeve. In such an instance, both the plug pins 5 and 5' have their light waveguides mounted coaxially on the axis of the plug pin in the same manner.

In order to facilitate the introduction of the plug pin 7 into the acceptance space 3 of the guide sleeve 1, the plug pin 7 is provided with an end section 10 which has a frusto conical surface tapering inward and terminating at an end surface 9. Thus, when inserting the pin 5 into the sleeve, the section 10 is first introduced into the sleeve.

As illustrated, the guide sleeve 1 has a transition section 11 which is immediately adjacent the acceptance opening and tapers divergently to a large diameter bore or opening section 14 which is coaxial to the acceptance opening 3 and is adjacent the end 8 of the sleeve 1. The opening section or bore 14 has a larger diameter in comparison to the diameter of the acceptance opening 3 and forms a transition line with the transition section 11.

A sliding sleeve 13 of a synthetic plastic preferably a tetrafluoroethylene such as polytetrafluoroethylene sold under the trademark "Teflon" is disposed in this bore or section 14 with a first end at the transition line. The sliding sleeve 13 is designed so that its cylindrical outer surface 12 presses against the inner surface of the section 14 and so that the outer surface 12 extends parallel to the axis 2 of the sleeve 1. In contrast, thereto, the inside diameter of the tubular shaped sliding sleeve 13 tapers inwardly to a reduced diameter at the first end which is spaced inwardly from the end 8 of the sleeve 1 and is immediately adjacent the transition section 11. Thus, the diameter of the inner surface decreases as the distance from the end 8 increases. The sliding sleeve 13 at the one end has a limiting wall 15 which extends at right angles to the axis 2 of the sleeve. As a result thereof, a wedge shaped edge 16 or stripping lip is formed between the inner surface of the sleeve 13 and the wall 15. The wedge shaped edge or stripping lip 16 will elastically conform to the outer surface 5 of the pin 7 during insertion of the pin into the acceptance opening 3 and thus wipes off dust particles and other deposits therefrom. The transition section 11 of the guide sleeve 1 makes it possible for the edge 16 to elastically shift to a certain degree in the direction towards the acceptance opening 3 of the guide sleeve 1 during and after insertion of the plug or pin 7.

In this manner, the sliding sleeve 13 forms elastically resilient guide member for the plug or pin 7 which cooperates with the conical section 10 of the pin 7 in order to lead the pin 7 to the acceptance opening of the guide sleeve with low friction and operationally reliability. This will occur even when the plug pin exhibits a slight axial offset relative to the axis 2 of the sleeve 1 during insertion of the pin into the sleeve or when its axis 6 is slightly tilted relative to the axis 2 of the sleeve 1.

Although various minor modifications may be suggested by those versed in the art, it should be understood that I wish to embody within the scope of the patent granted hereon all such modifications as reasonably and properly come within the scope of my contribution to the art.

I claim:

1. In a guide sleeve for receiving at least one pin-shaped body having a light waveguide end section secured in said body concentric with an axis of said body to form a light waveguide plug connection, said guide sleeve having a cylindrical bore extending coaxially on an axis of the sleeve to at least one end of the sleeve to form an acceptance opening for receiving the pin-shaped body, said cylindrical bore forming a first portion having an inner surface matched to a cylindrical surface of the pin-shaped body to enable forming a play-free fit therebetween and at an end of the guide sleeve a second portion coaxial to the first portion and of a larger diameter, the improvements comprising a sliding sleeve of a synthetic plastic material being disposed in said second portion of the bore with a first end adjacent the first portion of the bore, said sliding sleeve being a tubular sleeve with a tapering inside diameter decreasing toward said first end and having a limiting wall at said first end, said limiting wall coacting with the inside surface of said sliding sleeve to form a wedge-shaped edge, said edge elastically conforming to said cylindrical outer surface of said pin-shaped body so that during insertion of the pin-shaped body into the acceptance opening, said edge of said sliding sleeve wipes the outer surface of said pin-shaped body.

2. In a guide sleeve according to claim 1, wherein the guide sleeve between the first and the second portion of the bore has a transition section conically expanding from the diameter of the first portion to the diameter of the second portion and the transition section forming a transition line with the second portion, said sliding sleeve being disposed in the second portion with the limiting wall at the transition line so that the edge during insertion of the pin-shaped body can be deformed into the space of the transition section.

3. In a guide sleeve according to claim 2, wherein the synthetic plastic material is tetrafluoroethylene.

4. In a guide sleeve according to claim 1, wherein the synthetic plastic material is polytetrafluoroethylene.

* * * * *